MONITOR EMPLOYING LOGIC GATE AND COUNTER TO INDICATE NORMAL PULSE-TRAIN FAILURE AFTER PREDETERMINED TIME INTERVAL
Filed Nov. 30, 1965
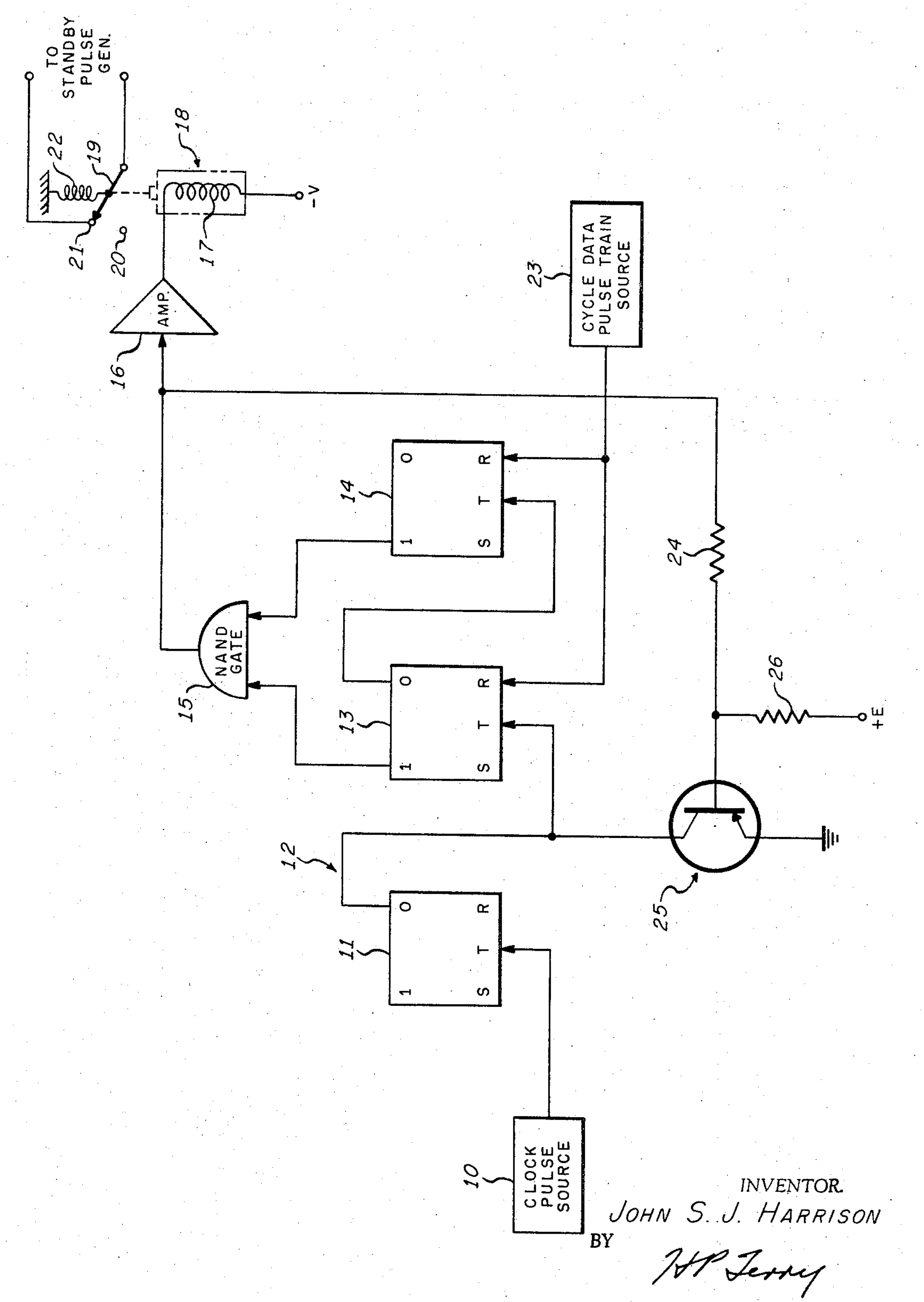
INVENTOR.
JOHN S. J. HARRISON
BY
H P Terry
ATTORNEY

United States Patent Office 3,350,580

Patented Oct. 31, 1967

3,350,580

MONITOR EMPLOYING LOGIC GATE AND COUNTER TO INDICATE NORMAL PULSE-TRAIN FAILURE AFTER PREDETERMINED TIME INTERVAL

John S. J. Harrison, Hicksville, N.Y., assignor to Sperry Rand Corporation, a corporation of Delaware Filed Nov. 30, 1965, Ser. No. 510,657

3 Claims. (Cl. 307—88.5)

ABSTRACT OF THE DISCLOSURE

A pulse train failure monitor responsive to pulse trains having a variable repetition frequency for providing a monitoring signal for the duration of the failure of the monitored pulse train.

The present invention concerns a monitor for detecting the failure of a pulse train.

The present invention is particularly suitable for detecting the failure of a pulse train in traffic intersection controllers of the type disclosed in U.S. patent application S.N. 453,072, entitled "Traffic Intersection and Other Controllers," inventor John J. King, filed May 4, 1965. As disclosed in said U.S. patent application Ser. No. 453,072, cycle information is transmitted from a master controller to local traffic intersection controllers by a variable frequency pulse train whose frequency is proportional to cycle duration. This pulse train is utilized for the internal timing of the local traffic intersection controller mechanisms. The failure of this pulse train would, in the absence of the present invention, result in the loss of traffic control at a plurality of intersections supervised by the master controller. A fixed frequency emergency standby pulse generator is included in each local intersectiton controller which is activated by means of the present invention in the event of failure of the cycle pulse train.

A prior art pulse train monitor that could perform the required function employs an RC network. However, RC networks are known to be inherently inaccurate which may result in a fallacious failure indication. Further the frequency of the monitored pulse train can vary between one and four pulses per second, for example, and it is difficult to obtain a suitable time constant from RC networks. Other prior art pulse train monitors are suitable only for pulse trains having a fixed frequency. Still other prior art pulse train monitors do not provide a sustained failure signal in the absence of the pulse train.

It is a primary object of the present invention to provide a pulse train failure monitor responsive to pulse trains having a variable repetition frequency.

It is another object of the present invention to provide a pulse train failure monitor which continues to provide a monitoring signal for the duration of the failure of the monitored pulse train.

Additional objects and advantages will become apparent by referring to the specification and drawing in which the single drawing is an electrical schematic diagram of a pulse train failure monitor incorporating the present invention.

Referring now to the drawing, a source of clock pulses 10 is connected to provide clock pulses to the toggle input terminal of a first stage 11 of a three stage binary counter 12. The three stage binary counter 12 comprises three identical flip flops 11, 13 and 14 representing the first, second and third stages respectively. Each of the stages 11, 13 and 14 has a toggle, set and reset whereby in the set stage a binary one output is provided while in the reset stage a binary zero output is provided. The binary zero output terminal of the first stage 11 is connected to the toggle input terminal of the second stage 13, while the binary zero output of the second stage 13 is connected to the toggle input of the third stage 14. The binary one output of the second and third stages 13 and 14 are connected to respective input terminals of a NAND gate circuit 15. The NAND gate 15 has its output terminal connected through an amplifier 16 to the coil 17 of a relay 18. The coil 17 has its other extremity connected to a source of negative potential indicated by the —V legend. In its energized condition, the contact arm 19 of the relay 18 abuts against a blank contact 20 while in its unenergized position, it abuts against a contact 21 due to a spring 22 thereby closing a circuit to energize a standby pulse generator indicated by the legend in a manner to be more fully explained.

The cycle data pulse train to be monitored is provided from a cycle data pulse train source 23. The cycle pulses from the source 23 are connected to energize the reset input terminals of the second and third stages 13 and 14 of the counter 12.

In order to continue to provide a monitoring signal in the event of malfunction of the cycle pulses, the output terminal of the NAND gate 15 is also connected through a dropping resistor 24 to the base of a transistor 25 which has its collector connected to the binary zero output terminal of the first stage 11 and its emitter connected to ground potential. The base of the transistor 25 is also connected through a resistor 26 to a source of positive potential indicated by the legend +E.

In operation, the three stage binary counter 12 is initially reset to zero. The NAND gate 15 is thus disabled and is arranged to provide a ground potential to the amplifier 16. With a negative voltage —V applied to the other extremity of the winding 17, the relay 18 is energized thereby holding the contact arm 19 against the blank contact 20 which disables the standby pulse generator since the circuit to it is open. Further, the ground potential from the NAND gate 15 is also applied to the base of the transistor 25 thereby keeping it in its off condition.

As the clock pulses from the source 10 are counted, the contents of the three stage binary counter 12 increases. The counter 12 is arranged so that in normal operation the succeeding cycle pulse from the source 23 arrives prior to the time that a sufficient number of clock pulses have been counted to provide a binary one output signal from both the second and third stage counters 13 and 14. In normal operation, the cycle pulse from the source 23 resets the counter 12 before the clock pulses from the source 10 can enable the NAND gate circuit 15 and the potential difference across the coil 17 keeps the relay 18 energized. Thus the monitored pulse train from the source 23 is employed to reset the counter 12. The counter 12 is designed to reach the predetermined count in a time slightly longer than the spacing between adjacent pulses of the lowest frequency pulse train to be monitored.

Upon malfunction or failure of the cycle pulses from the source 23, the contents of the counter 12 increases as the clock pulses from the source 10 are counted and in the absence of the resetting cycle pulse, the counter 12 attains the predetermined count required to provide a binary one output from the second and third stages 13 and 14 thereby enabling the NAND gate 15. This connects a monitoring potential of —V to the amplifier 16 which de-energizes the relay 18 since then there is a zero potential difference across the winding 17. Under the urging of the spring 22, the contact arm 19 now abuts the contact 21 thereby closing the circuit to energize the standby pulse generator which provides standby cycle data pulses.

The monitor signal output of the NAND gate circuit 15 also turns on the transistor 25 by applying a negative potential to its base. This connects the binary zero output of the first stage 11 to ground potential thus preventing any additional clock pulses from reaching the second stages 13 and 14 thereby halting the count. The second and third stages 13 and 14 continue to provide a binary one output and continue to enable the NAND gate 15 which in turn maintains the relay 18 unenergized causing the standby pulse generator to provide auxiliary cycle data pulses for the duration of the malfunction of the data pulse train from the source 23.

Upon resumption of the pulses from the source 23, the second and third stages 13 and 14 no longer both provide binary one output signals and the NAND gate circuit 15 returns to its normal condition of providing ground potential thereby energizing the relay 18 and disabling the standby pulse generator.

It will therefore be appreciated from the above explanation that the system is failsafe in that the activating relay 18 is normally energized and only becomes de-energized in the event of failure of the cycle data pulse train. Further it remains de-energized until resumption of the cycle data pulses.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A pulse train failure monitor for detecting the malfunction of a data pulse train comprising (1) clock pulse generating means for providing clock pulses having a predetermined repetition rate, (2) counting means responsive to said clock pulses and having first, second and third stages in cascade for counting in response to said clock pulses, said counting means including means for providing first and second outputs only from said second and third stages upon counting a predetermined number of said clock pulses coupled only to said first stage, (3) data pulse train generating means for providing data pulses having a normal repetition rate greater than said predetermined number of clock pulses, (4) said second and third stages of said counting means each including reset input terminal means responsive to said data pulses to normally reset said second and third stages prior to counting said predetermined number of clock pulses to prevent said first and second outputs during normal operation, and (5) algebraic summation means responsive to said first and second outputs for providing a monitoring signal when energized by both of said first and second outputs.

2. In a system of the character recited in claim 1 further including shunting means responsive to said clock pulses and said monitoring signal for rendering additional clock pulses ineffective for the duration of said monitoring signal.

3. In a system of the character recited in claim 2 in which said shunting means includes a transistor having its base responsive to said monitoring signal, its collector responsive to said clock pulses and its emitter connected to ground potential.

References Cited

UNITED STATES PATENTS

| | | | |
|---|---|---|---|
| 3,035,187 | 5/1962 | Reichert | 328—46 |
| 3,116,477 | 12/1963 | Bradbury | 307—88.5 |
| 3,165,647 | 1/1965 | De Bottari et al. | 307—88.5 |

ARTHUR GAUSS, *Primary Examiner.*

DAVID J. GALVIN, *Examiner.*

J. S. HEYMAN, *Assistant Examiner.*